US011845112B2

(12) United States Patent
Sugiura

(10) Patent No.: US 11,845,112 B2
(45) Date of Patent: Dec. 19, 2023

(54) PRESSURE WASHER

(71) Applicant: MAKITA CORPORATION, Anjo (JP)

(72) Inventor: Hideaki Sugiura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 290 days.

(21) Appl. No.: 17/271,766

(22) PCT Filed: Aug. 1, 2019

(86) PCT No.: PCT/JP2019/030355
§ 371 (c)(1),
(2) Date: Feb. 26, 2021

(87) PCT Pub. No.: WO2020/044940
PCT Pub. Date: Mar. 5, 2020

(65) Prior Publication Data
US 2021/0323033 A1 Oct. 21, 2021

(30) Foreign Application Priority Data
Aug. 28, 2018 (JP) .................. 2018-159387

(51) Int. Cl.
*B08B 3/02* (2006.01)
*F04B 17/03* (2006.01)

(52) U.S. Cl.
CPC .............. *B08B 3/026* (2013.01); *F04B 17/03* (2013.01); *B08B 2203/027* (2013.01); *B08B 2203/0211* (2013.01); *B08B 2203/0223* (2013.01)

(58) Field of Classification Search
CPC .......... F04B 17/03; F04B 17/06; F04B 53/16; B08B 3/026; B08B 2203/0211; B08B 2203/0223; B08B 2203/027; H01M 50/247; H01M 50/271; H01M 2220/30
See application file for complete search history.

(56) References Cited

U.S. PATENT DOCUMENTS

2005/0006400 A1* 1/2005 Shapanus .............. B05B 9/0861
222/1
2015/0050169 A1* 2/2015 Horie ...................... B08B 3/026
417/410.1

FOREIGN PATENT DOCUMENTS

| CN | 101947522 A | 1/2011 |
| CN | 103624021 A | 3/2014 |
| CN | 104114863 A | 10/2014 |
| JP | 57-60872 Y2 | 12/1982 |

(Continued)

OTHER PUBLICATIONS

Written opinion for PCT/JP2019/030355 dated Oct. 29, 2019.

(Continued)

*Primary Examiner* — Alexander B Comley
(74) *Attorney, Agent, or Firm* — Sughrue Mion, PLLC

(57) ABSTRACT

A pressure washer disclosed herein may include a pump mechanism configured to pressurize water supplied through a water inlet and pump out the water through a water outlet, an electric motor configured to drive the pump mechanism, and a housing that houses the pump mechanism and the electric motor. An outer surface of the housing most proximate to the electric motor may have a shape that does not allow the pressure washer to stand on its own when the outer surface is used as a placement surface.

3 Claims, 12 Drawing Sheets

(56) References Cited

FOREIGN PATENT DOCUMENTS

| | | |
|---|---|---|
| JP | 2013-169486 A | 9/2013 |
| JP | 2014-213295 A | 11/2014 |
| JP | 2016-002537 A | 1/2016 |
| WO | 2010/078700 A1 | 7/2010 |
| WO | 2014/000824 A1 | 1/2014 |

OTHER PUBLICATIONS

International search report for PCT/JP2019/030355 dated Oct. 29, 2019.
Written Opinion of the International Searching Authority dated Oct. 29, 2019 in Application No. PCT/JP2019/030355.
Office Action dated Jul. 19, 2022, issued in Japanese Application No. 2018-159387.
Office Action dated Apr. 19, 2022 from the Japanese Patent Office in JP Application No. 2018-159387.
Office Action dated Apr. 29, 2022 in Chinese Application No. 201980056696.0.

* cited by examiner

PRESSURE WASHER

CROSS-REFERENCE TO RELATED APPLICATIONS

This application is a National Stage of International Application No. PCT/JP2019/030355 filed Aug. 1, 2019, which claims priority under U.S.C. § 119(a) to Japanese Patent Application No. 2018-159387 filed on Aug. 28, 2018.

TECHNICAL FIELD

The technique disclosed herein relates to a pressure washer.

BACKGROUND ART

Japanese Patent Application Publication No. 2016-2537 describes a pressure washer provided with a pump mechanism configured to pressurize water supplied through a water inlet and pump out the water through a water outlet, an electric motor configured to drive the pump mechanism, and a housing that houses the pump mechanism and the electric motor.

SUMMARY OF INVENTION

Technical Problem

There may be a case in which water is gathered inside the housing due to water entering a housing from outside or due to water leak from a pump mechanism. If an electric motor is located proximate to a placement surface of the housing in a state where a pressure washer is placed, there is a risk that the electric motor is wetted and thereby fails when water is gathered inside the housing. The disclosure herein provides art that can prevent an electric motor from failing even when water gathers inside a housing.

Solution to Technical Problem

A pressure washer disclosed herein may comprise a pump mechanism configured to pressurize water supplied through a water inlet and pump out the water through a water outlet, an electric motor configured to drive the pump mechanism, and a housing that houses the pump mechanism and the electric motor. An outer surface of the housing most proximate to the electric motor may have a shape that does not allow the pressure washer to stand on its own when the outer surface is used as a placement surface. The shape that does not allow the pressure washer to stand on its own described herein refers to a shape of the placement surface that does not contact any flat surface at three points surrounding a point on which a center of gravity of the pressure washer is projected.

If the pressure washer is configured to stand on its own with the outer surface of the housing most proximate to the electric motor as the placement surface, the pressure washer could be used in this state, which may result in failure of the electric motor due to being wetted by the water when the water gathers inside the housing. According to the above configuration, since the pressure washer cannot stand on its own with the outer surface of the housing most proximate to the electric motor is used as the placement surface, the pressure washer can be prevented from being used in this state. Due to this, when the water gathers inside the housing, the water can be prevented from wetting the electric motor, and failure of the electric motor can be prevented.

DESCRIPTION OF EMBODIMENTS

Figure 1:
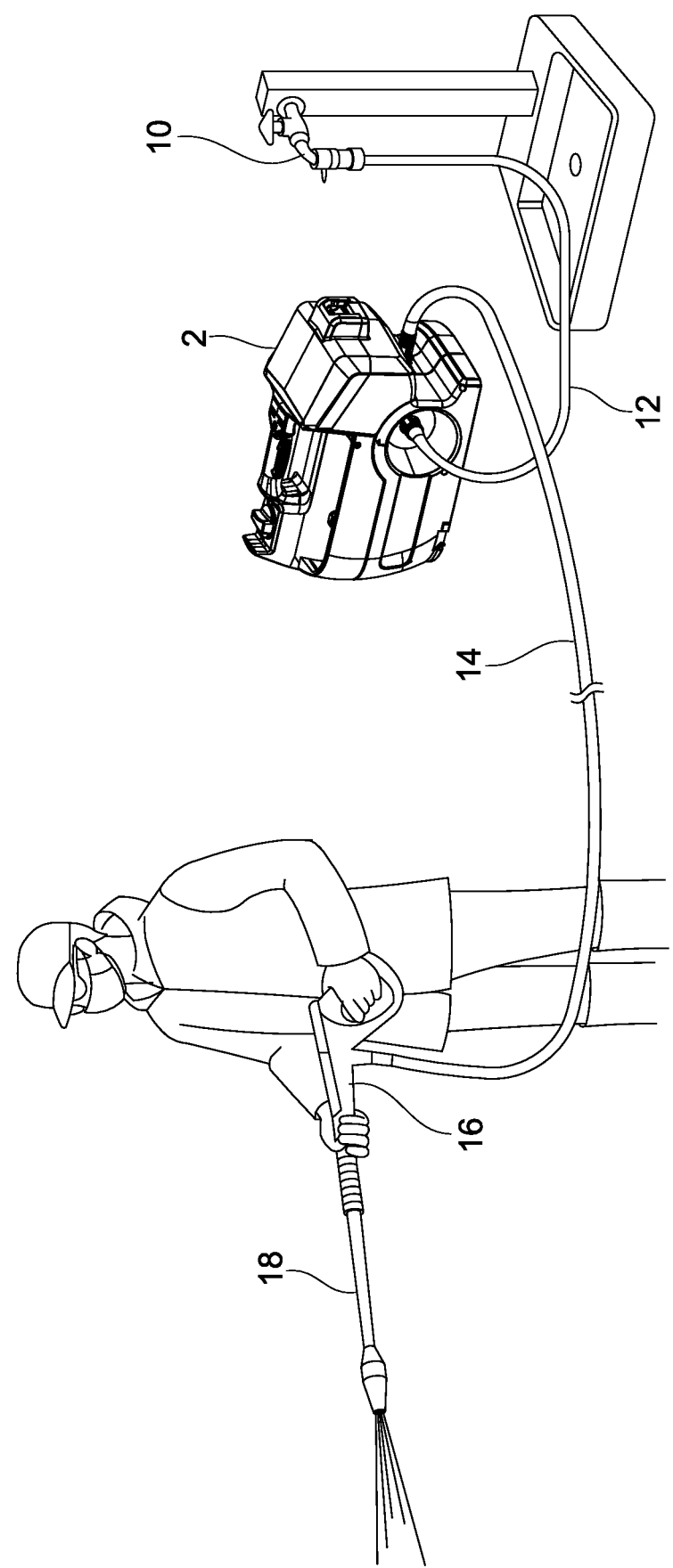
FIG. 1 schematically shows a state of a pressure washer 2 of an embodiment in use.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved pressure washers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a pressure washer may comprise a pump mechanism configured to pressurize water supplied through a water inlet and pump out the water through a water outlet, an electric motor configured to drive the pump mechanism, a housing that houses the pump mechanism and the electric motor, and a plurality of batteries detachably attached to the housing and configured to supply power to the electric motor.

According to the above configuration, high-voltage power can be supplied to the electric motor for example by electrically connecting the plurality of low-voltage batteries in series. The low-voltage batteries can thereby be used in the pressure washer with a high output.

In one or more embodiments, the pressure washer may further comprise a top handle provided at an upper portion of the housing and having a longitudinal direction along a front-rear direction when the pressure washer is seen from above. In a right-left direction, a center of gravity of the pressure washer to which the plurality of batteries is attached may be located within an area 1.5 times a width of the top handle in the right-left direction from a center line of the top handle.

According to the above configuration, balance in the right-left direction can be achieved easily upon gripping the top handle and lifting up the pressure washer.

In one or more embodiments, the pressure washer may further comprise a top handle provided at an upper portion of the housing and having a longitudinal direction along a front-rear direction when the pressure washer is seen from above. In the front-rear direction, a center of gravity of the pressure washer to which the plurality of batteries is attached is located within an area between front and rear ends of a lower surface of the top handle.

According to the above configuration, balance in the front-rear direction can be achieved easily upon gripping the top handle and lifting up the pressure washer.

In one or more embodiments, a pressure washer may comprise a pump mechanism configured to pressurize water supplied through a water inlet and pump out the same through a water outlet in accordance with rotation of a drive shaft, an electric motor configured to drive an output shaft, a driving power transmission mechanism configured to transmit driving power from the output shaft to the drive shaft, and a housing that houses the pump mechanism, the electric motor, and the driving power transmission mechanism. The output shaft may be disposed substantially parallel to the drive shaft. The output shaft may be disposed higher than the drive shaft.

In the above configuration, since the output shaft of the electric motor is disposed higher than the drive shaft of the pump mechanism, the electric motor is disposed slightly higher than the pump mechanism. Due to this, even if the water leaks from the pump mechanism, the water can be prevented from wetting the electric motor, by which failure of the electric motor can be prevented.

In one or more embodiments, the pressure washer may further comprise a battery detachably attached to the housing and configured to supply power to the electric motor. A position of a lower end of the battery when the battery is attached may be disposed higher than the drive shaft.

When the water wets the battery, the battery may fail. In the above configuration, since the lower end of the battery is disposed higher than the drive shaft of the pump mechanism, the battery is disposed slightly higher than the pump mechanism. Due to this, even if the water leaks from the pump mechanism, the water can be prevented from wetting the battery, by which the failure of the battery can be prevented.

In one or more embodiments, the pressure washer may further comprise an ECU housed in the housing and configured to control operations of the electric motor. The ECU may be disposed higher than the pump mechanism.

When the water wets the ECU, the ECU may fail. In the above configuration, the ECU is disposed higher than the pump mechanism. Due to this, even if the water leaks from the pump mechanism, the water can be prevented from wetting the ECU, by which failure of the ECU can be prevented.

In one or more embodiments, a pressure washer may comprise a pump mechanism configured to pressurize water supplied through a water inlet and pump out the water through a water outlet, an electric motor configured to drive the pump mechanism, and a housing that houses the pump mechanism and the electric motor. An outer surface of the housing most proximate to the electric motor may have a shape that does not allow the pressure washer to stand on its own when the outer surface is used as a placement surface. The shape that does not allow the pressure washer to stand on its own described herein refers to a shape of the placement surface that does not contact any flat surface at three points surrounding a point on which the center of gravity of the pressure washer is projected.

If the pressure washer is configured to stand on its own with the outer surface of the housing most proximate to the electric motor as the placement surface, the pressure washer could be used in this state, which may result in failure of the electric motor due to being wetted by the water when the water gathers inside the housing. According to the above configuration, since the pressure washer cannot stand on its own with the outer surface of the housing most proximate to the electric motor is used as the placement surface, the pressure washer can be prevented from being used in this state. Due to this, when the water gathers inside the housing, the water can be prevented from wetting the electric motor, and failure of the electric motor can be prevented.

In one or more embodiments, the outer surface of the housing most proximate to the electric motor may have a shape that is rounded in two directions orthogonal to each other.

According to the above configuration, it can be ensured that the pressure washer does not stand on its own when the outer surface of the housing most proximate to the electric motor is used as the placement surface.

In one or more embodiments, the outer surface of the housing most proximate to the electric motor may have a shape protruding outward.

According to the above configuration, it can be ensured that the pressure washer does not stand on its own when the outer surface of the housing most proximate to the electric motor is used as the placement surface.

In one or more embodiments, the pressure washer may further comprise a battery configured to supply power to the electric motor, and a cover member that covers a space in which the battery is housed and that can be opened and closed. The cover member may be closed when the pressure washer is placed.

According to the above configuration, since the cover member is in a closed state when the pressure washer is used in the state of being placed, the water can be prevented from entering the space in which the battery is housed.

Embodiments

A pressure washer 2 of an embodiment will be described with reference to the drawings. As shown in FIG. 1, cleansing water such as water is supplied to the pressure washer 2 from a water supply source 10 such as a tap water line through a pressure hose 12. The pressure washer 2 is configured to pressurize the cleansing water and supply the high-pressure cleansing water to a trigger gun 16 through a high-pressure hose 14. A nozzle 18 is attached to the trigger gun 16. The trigger gun 16 is configured to switch between a state of supplying the cleansing water to the nozzle 18 and a state of cutting off supply of the cleansing water to the nozzle 18 in accordance with an operation by a user. The nozzle 18 is configured to spray the cleansing water supplied from the trigger gun 16 from its distal end.

Figure 2:
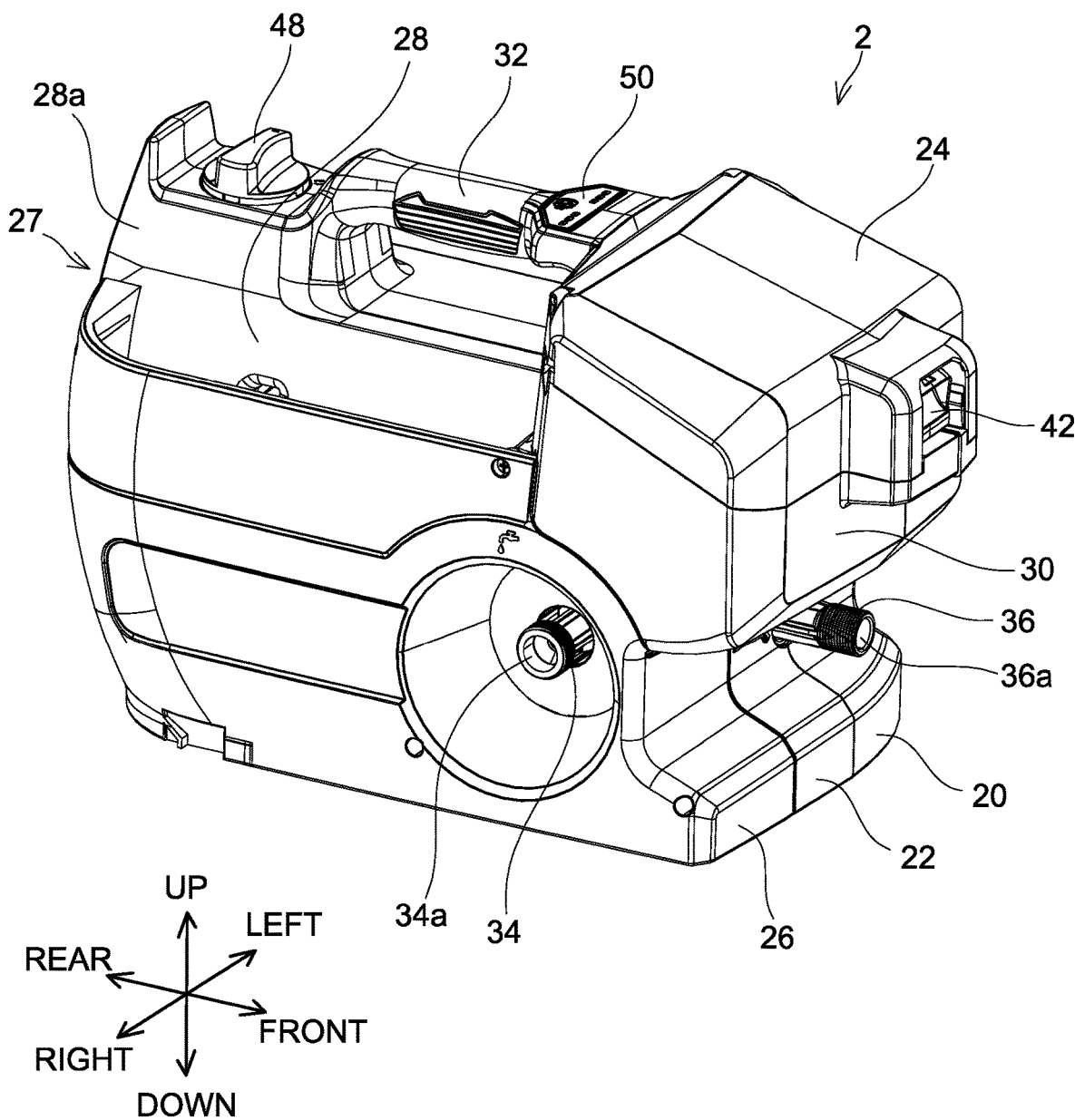
FIG. 2 is a perspective view of the pressure washer 2 of the embodiment seen from a front right upper side.
Figure 3:
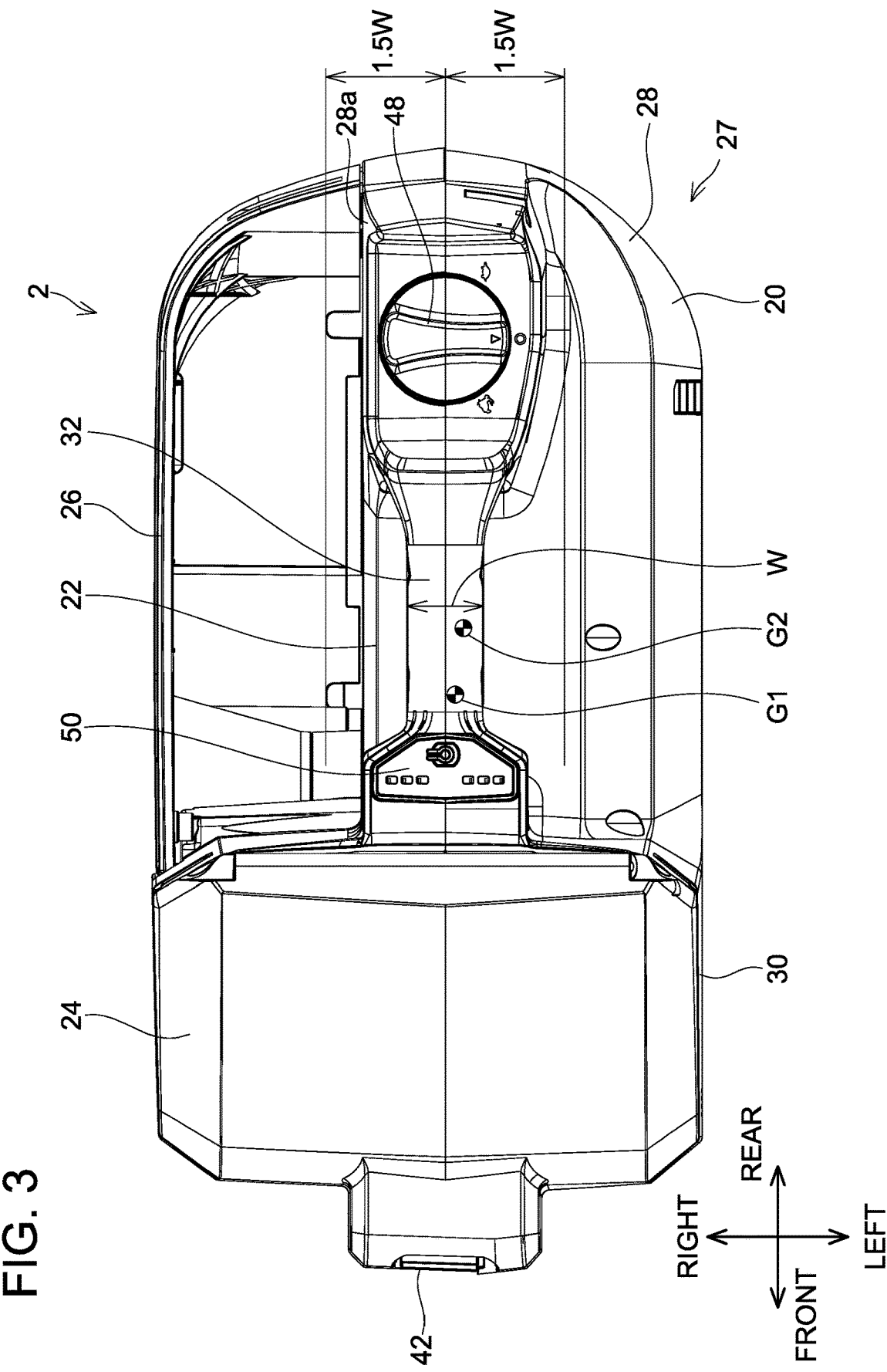
FIG. 3 is a plan view of the pressure washer 2 of the embodiment seen from above.
Figure 4:
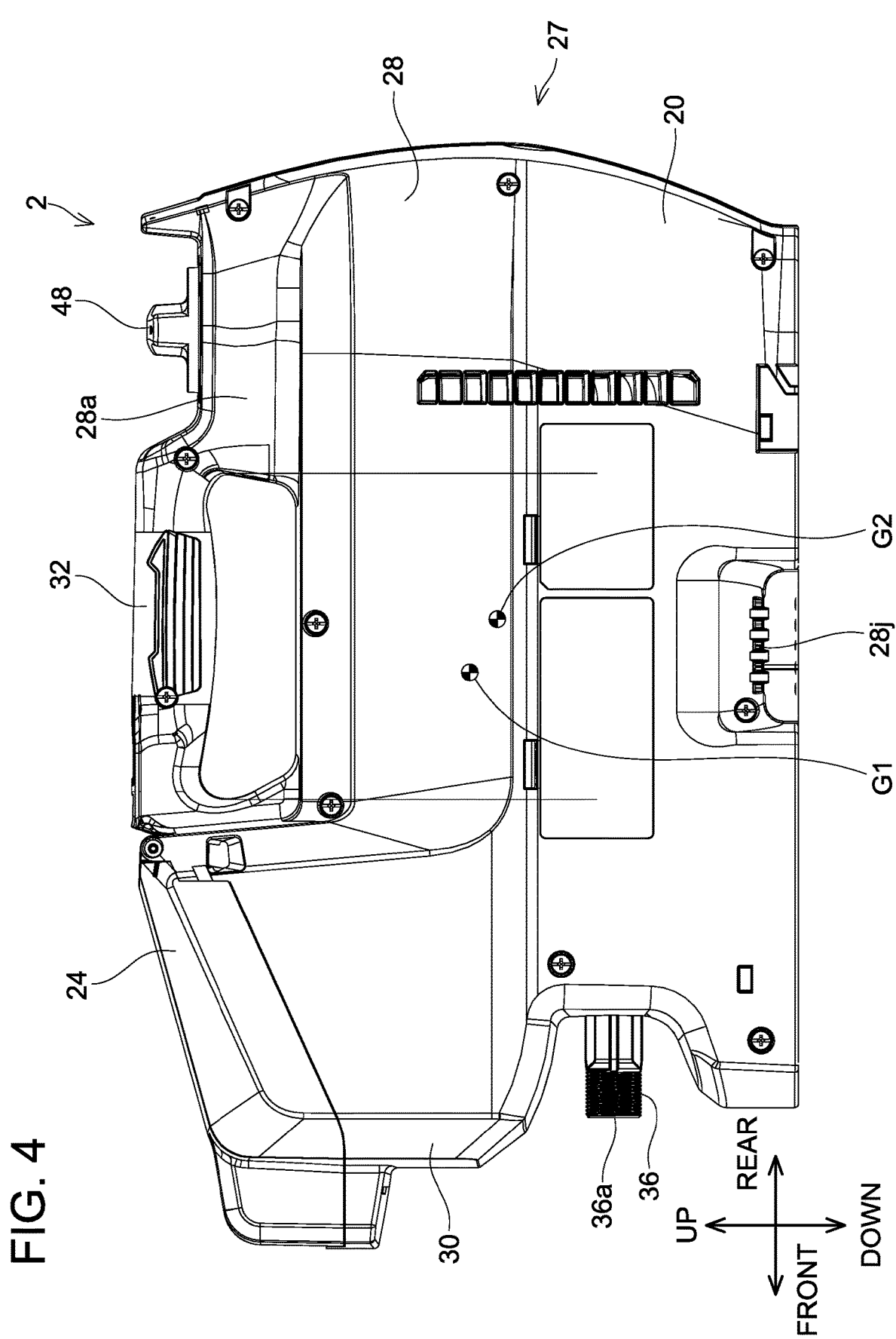
FIG. 4 is a side view of the pressure washer 2 of the embodiment seen from a left side.
Figure 5:
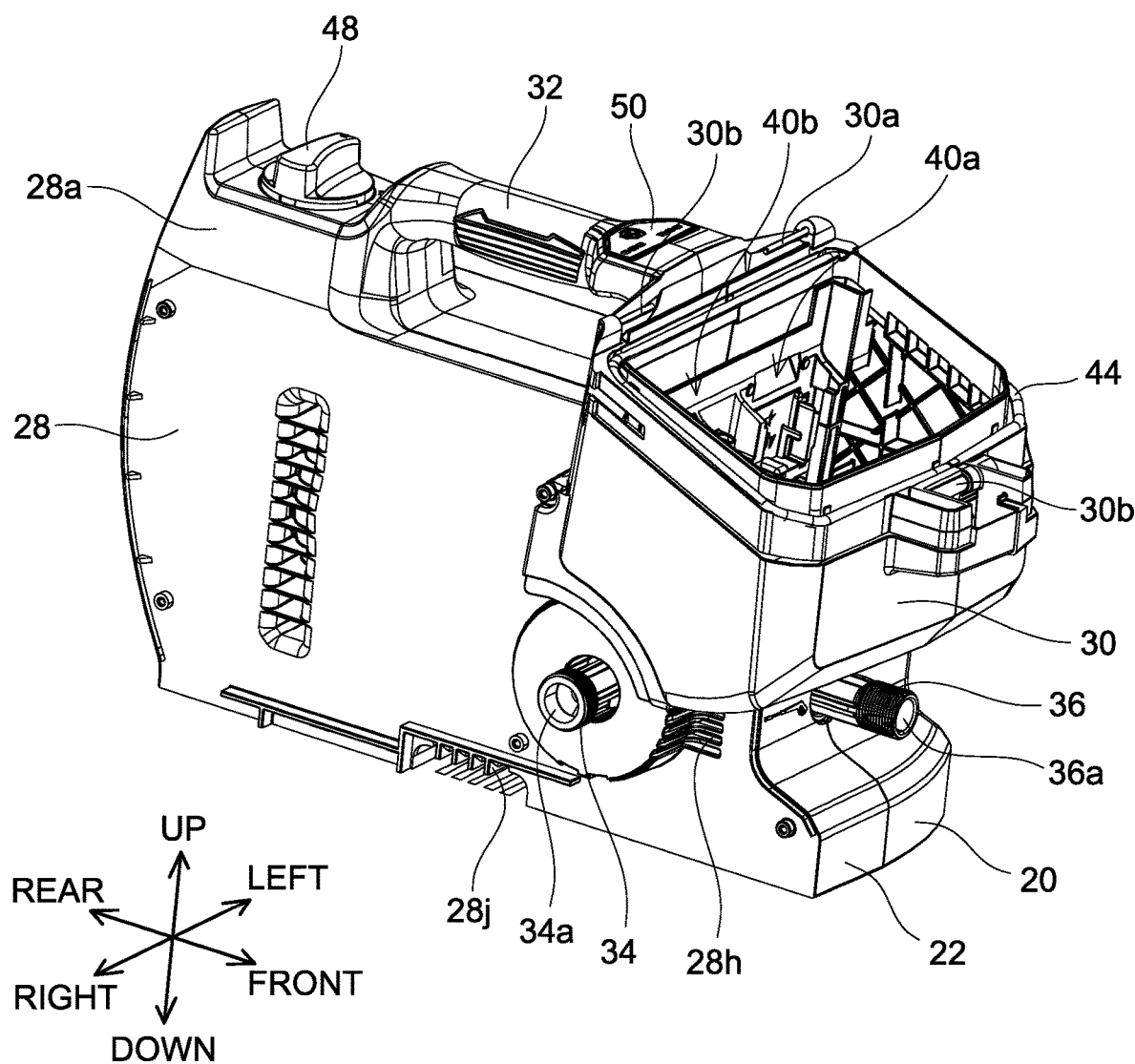
FIG. 5 is a perspective view of the pressure washer 2 of the embodiment seen from the front right upper side in a state of having a battery box cover 24 and an accessory box 26 detached.

As shown in FIGS. 2 to 4, the pressure washer 2 includes a left housing 20, a right housing 22, a battery box cover 24, and an accessory box 26. Hereinbelow, the left housing 20, the right housing 22, the battery box cover 24, and the accessory box 26 may collectively be termed simply as a housing 27. As shown in FIG. 5, a body housing 28, a battery box 30, and a top handle 32 are configured by the left housing 20 and the right housing 22. The left housing 20 defines an outer shape of a left half of each of the body housing 28, the battery box 30, and the top handle 32, and the right housing 22 defines an outer shape of a right half of each of the body housing 28, the battery box 30, and the top handle 32.

The body housing 28 has a substantially rectangular parallelepiped shape in which a dimension in an up-down direction is greater than a dimension in a right-left direction and a dimension in a front-rear direction is greater than the dimension in the up-down direction. A water inlet joint 34 protruding rightward is provided at a front lower portion of a right surface of the body housing 28. The water inlet joint 34 protrudes outside from within the body housing 28 and the pressure hose 12 can be detachably attached to the water inlet joint 34 (see FIG. 1). The water inlet joint 34 includes a water inlet 34a through which the cleansing water flows in. A water outlet joint 36 protruding frontward is disposed at a lower portion of a front surface of the body housing 28. The water outlet joint 36 protrudes outside from within the body housing 28 and the high-pressure hose 14 can be detachably attached to the water outlet joint 36 (see FIG. 1). The water outlet joint 36 includes a water outlet 36a through which the cleansing water flows out.

Figure 6:
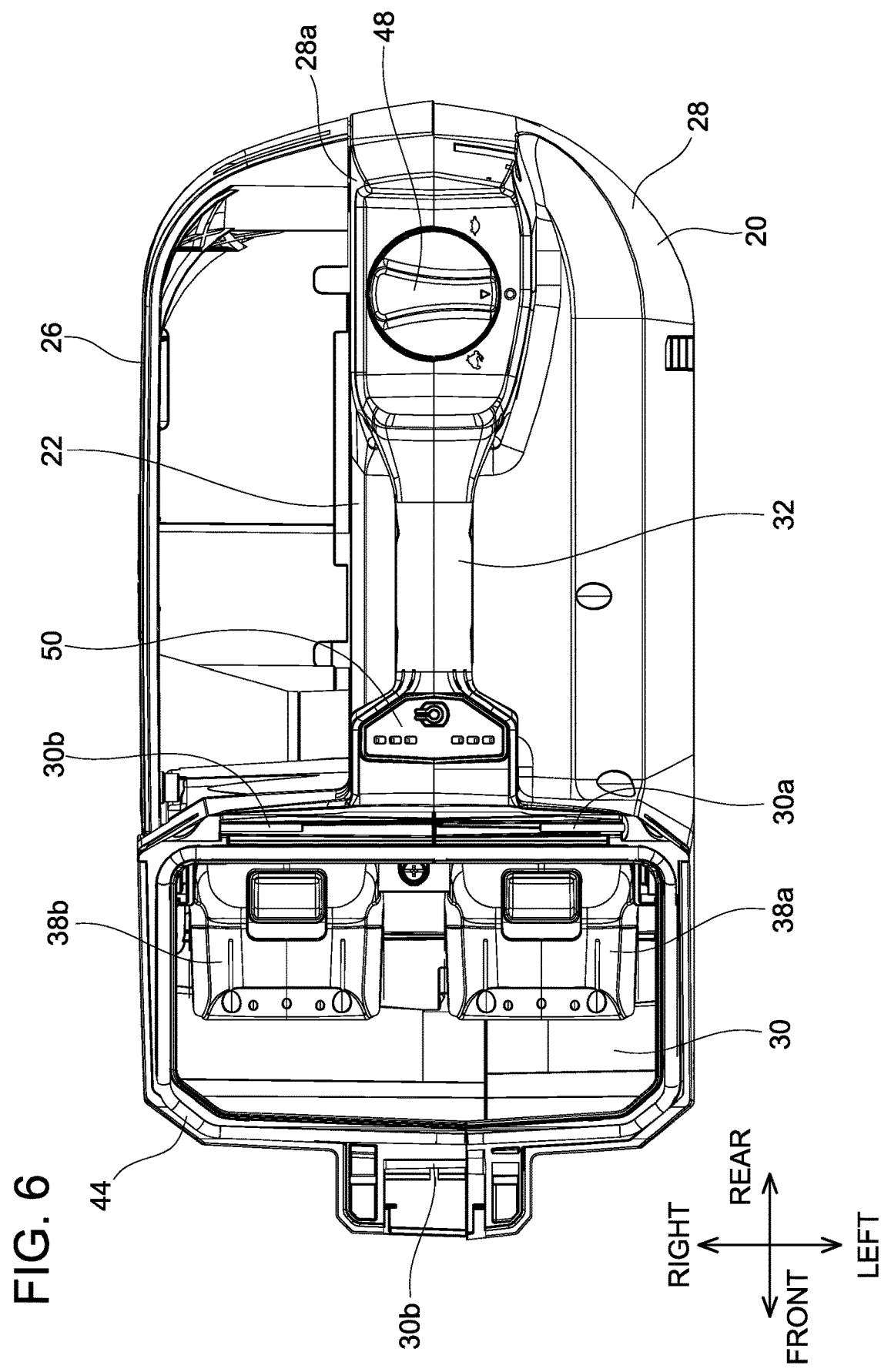
FIG. 6 is a plan view of the pressure washer 2 of the embodiment seen from above in a state of having the battery box cover 24 detached.
Figure 7:
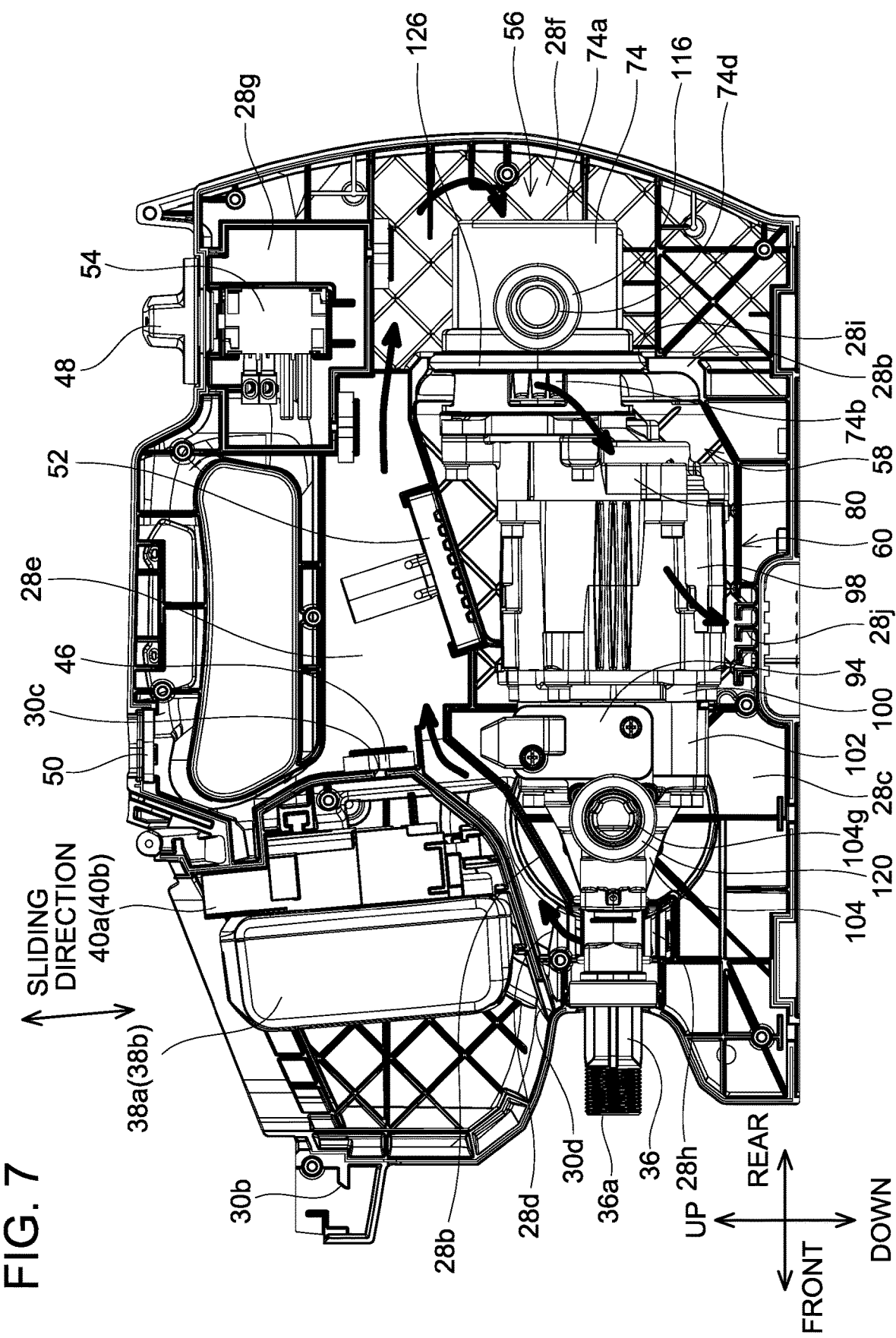
FIG. 7 is a side view of the pressure washer 2 of the embodiment seen from the left side in a state having the battery box cover 24 and a left housing 20 detached.

The battery box 30 is disposed at a front upper portion of the body housing 28. The battery box 30 has a box shape opened toward a front upper direction. A left outer surface of the battery box 30 is substantially flush with the left outer surface of the body housing 28, and a right outer surface of the battery box 30 protrudes further toward the right than the right outer surface of the body housing 28. As shown in FIGS. 6 and 7, a battery receptacle 40a to which a battery 38a can be detachably attached and a battery receptacle 40b to which a battery 38b can be detachably attached are disposed inside the battery box 30. As shown in FIG. 6, in a state of having attached the batteries 38a, 38b to the battery receptacles 40a, 40b, the batteries 38a, 38b are disposed adjacent each other in the right-left direction. Each of the batteries 38a, 38b is a secondary battery such as a lithium ion battery. A rated voltage of each of the batteries 38a, 38b is for example 18V. The batteries 38a, 38b are configured to be detachably attached to the battery receptacles 40a, 40b by sliding in a predetermined sliding direction with respect to the battery receptacles 40a, 40b. As shown in FIG. 7, the sliding direction of the batteries 38a, 38b is inclined with respect to the up-down direction of the body housing 28 such that upper portions thereof are slightly inclined frontward. When the body housing 28 is seen from a left side (or a right side), a position and a posture of the battery 38a in the state of being attached to the battery receptacle 40a substantially match a position and a posture of the battery 38b in the state of being attached to the battery receptacle 40b. In the state of having attached the batteries 38a, 38b to the battery receptacles 40a, 40b, the batteries 38a, 38b are electrically connected in series, as a result of which power having a total voltage (such as 36V) of the rated voltages (such as 18V) of the batteries 38a, 38b is supplied to the pressure washer 2.

As shown in FIGS. 2 to 4, the battery box cover 24 is disposed at an upper portion of the battery box 30. The battery box cover 24 is connected to the battery box 30 such that the battery box cover 24 is rotatable about a rotary shaft 30a (see FIGS. 5 and 6). The rotary shaft 30a is disposed at a rear upper portion of the battery box 30 and has its longitudinal direction along the right-left direction. The battery box cover 24 is biased in a closing direction by a torsion spring that is not shown. A latch 42 is disposed at a distal end of the battery box cover 24. As shown in FIGS. 5 and 6, a latch receptacle 30b is formed at an upper front portion of the battery box 30. The battery box cover 24 is maintained in a closed state by operating the latch 42 and engaging the same with the latch receptacle 30b in the state where the battery box cover 24 is closed. From this state, when the latch 42 is operated to release engagement with the latch receptacle 30b and the distal end of the battery box cover 24 is lifted up against biasing force of the torsion spring, the battery box cover 24 enters an open state. As shown in FIG. 6, a sealing member 44 constituted of resin is disposed at a peripheral edge of an opening of the battery box 30. Due to this, in the state where the battery box cover 24 is closed and the latch 42 is engaged with the latch receptacle 30b, a gap between the battery box 30 and the battery box cover 24 is sealed by the sealing member 44, thus water can be prevented from flowing into the battery box 30.

Figure 8:
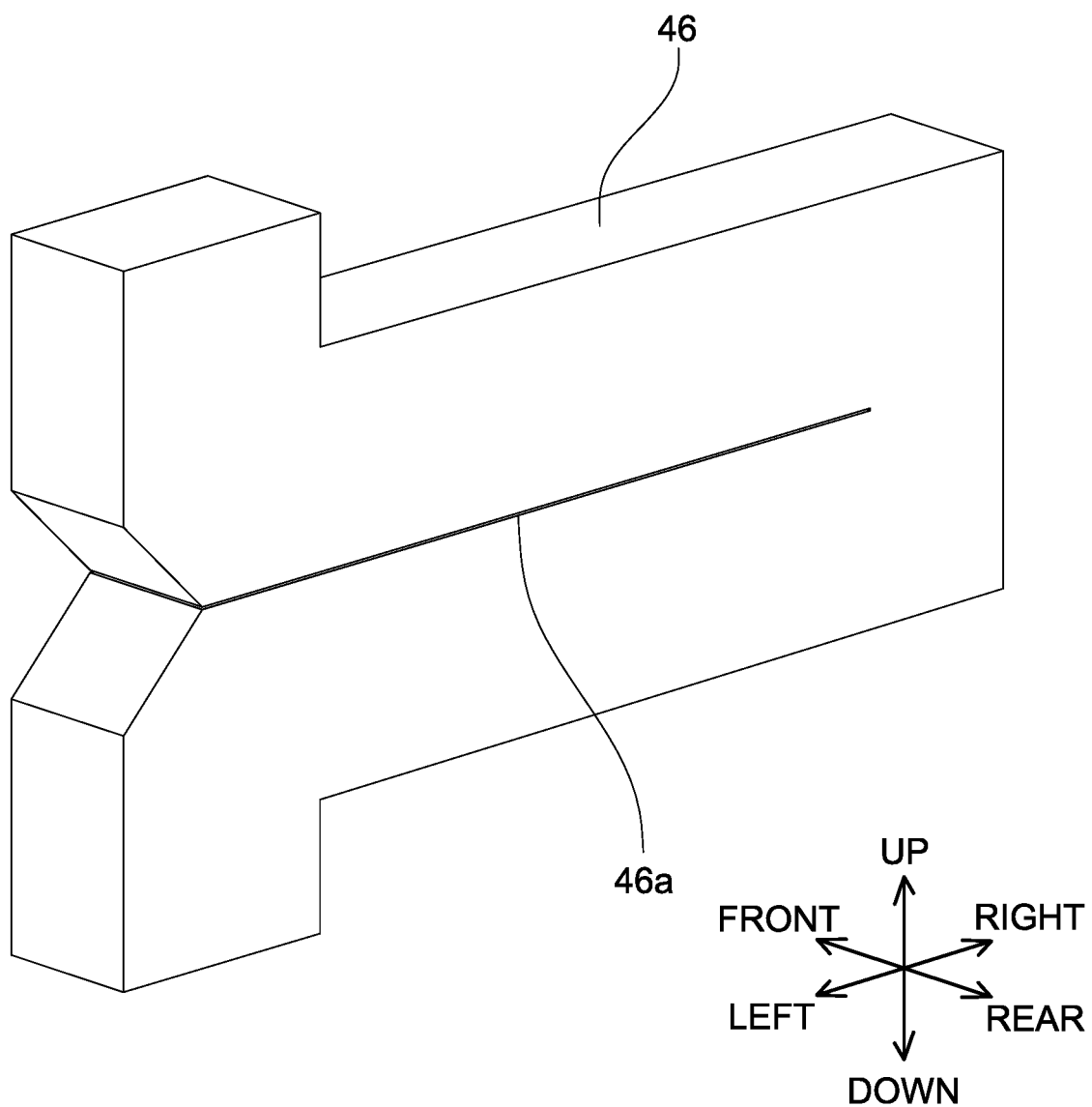
FIG. 8 is a perspective view of a sponge 46 of the pressure washer 2 of the embodiment.

As shown in FIG. 7, a through hole 30c for arranging wirings from within the battery box 30 into the body housing 28 is defined at a rear portion of the battery box 30. Wirings extending from the battery receptacles 40a, 40b are drawn into the body housing 28 through the through hole 30c. A sponge 46 is disposed on a body housing 28 side of the through hole 30c. As shown in FIG. 8, the sponge 46 includes a slit 46a configured to hold the wirings. With the sponge 46 disposed at the through hole 30c, water can be prevented from flowing into the battery box 30 from within the body housing 28 through the through hole 30c and also from flowing into the body housing 28 from within the battery box 30 through the through hole 30c.

As shown in FIG. 7, a water drainage hole 30d is defined at a lowermost portion of the battery box 30. Due to this, even if the water flows into the battery box 30, the water within the battery box 30 can be discharged into the body housing 28 through the water drainage hole 30d.

As shown in FIGS. 2 to 4, a supporting base 28a protruding upward is disposed at a rear upper portion of the body housing 28. The top handle 32 is disposed so as to connect a front upper portion of the supporting base 28a to the rear upper portion of the battery box 30. The top handle 32 has a substantially cylindrical shape. The user can grip the top handle 32 to lift up and carry the pressure washer 2. An adjustment dial 48 for adjusting a flow rate of the cleansing water discharged from the water outlet joint 36 is disposed on a top surface of the supporting base 28a. An operation display panel 50 for displaying a state of the pressure washer 2 for the user and accepting operation inputs from the user is disposed on a top surface of the top handle 32 proximate to its front end.

The accessory box 26 is mounted to the right surface of the body housing 28. A right outer surface of the accessory box 26 is substantially flush with the right outer surface of the battery box 30. The accessory box 26 configures a box-like shape with an opening at its top. When the pressure washer 2 is not used, accessories such as the trigger gun 16, the nozzle 18, the pressure hose 12, and the high-pressure hose 14 can be stored in the accessory box 26. When the user grips the top handle 32 in this state and lifts up the pressure washer 2, the pressure washer 2 can be carried along with the accessories.

The accessory box 26 has a shape that is recessed substantially in a truncated cone shape in the vicinity of the water inlet joint 34. A distal end of the water inlet joint 34 does not protrude rightward beyond the outer surface of the accessory box 26. As such, even when the pressure washer 2 to which the pressure hose 12 is not connected falls from a high place and a right surface of the pressure washer 2 crashes into a ground surface, the distal end of the water inlet joint 34 can be prevented from crashing into the ground surface and thereby being damaged.

The body housing 28 has a shape that is recessed substantially in a trapezoidal column shape in the vicinity of the water outlet joint 36. A distal end of the water outlet joint 36 does not protrude frontward beyond a plane contacting both the outer surface of the battery box 30 and the outer surface of the body housing 28. As such, even when the pressure washer 2 to which the high-pressure hose 14 is not connected falls from a high place and a front surface of the pressure washer 2 crashes into the ground surface, the distal end of the water outlet joint 36 can be prevented from crashing into the ground surface and thereby being damaged.

As shown in FIG. 7, an ECU (Electronic Control Unit) 52, a dial detection switch 54, an electric motor 56, a driving power transmission mechanism 58, and a pump mechanism 60 are housed inside the body housing 28. The ECU 52 is disposed at an upper center portion in the body housing 28. The ECU 52 is disposed above the pump mechanism 60 and below the top handle 32. In the state of having attached the batteries 38a, 38b to the battery receptacles 40a, 40b, the ECU 52 is disposed such that its lower end is located higher than lower ends of the batteries 38a, 38b and its upper end is located lower than upper ends of the batteries 38a, 38b. The ECU 52 is configured to control operations of various electric components mounted in the pressure washer 2. The dial detection switch 54 is disposed inside the supporting base 28a of the body housing 28. The dial detection switch 54 is configured to detect a rotation angle of the adjustment dial 48. The operation display panel 50 and the dial detection switch 54 are both connected to the ECU 52 via wirings that are not shown. Further, the ECU 52 is connected to the battery receptacles 40a, 40b via wirings (not shown) extending through the through hole 30c. Further, the ECU 52 is connected to the electric motor 56 via wirings that are not shown. The ECU 52 is configured to control operations of the electric motor 56 by controlling the power supplied from the batteries 38a, 38b to the electric motor 56 in accordance with signals inputted from the operation display panel 50 and the dial detection switch 54.

Figure 9:
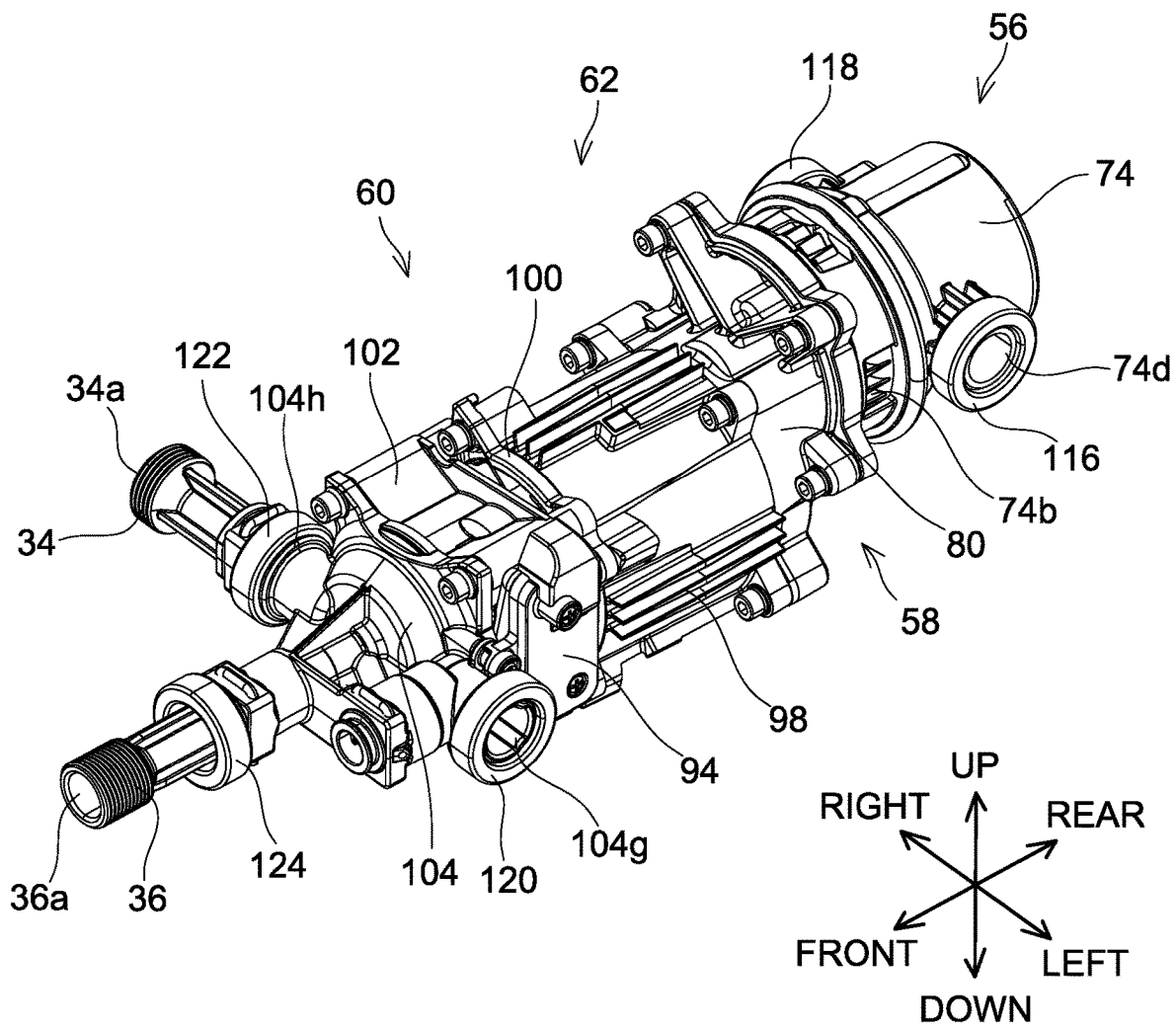
FIG. 9 is a perspective view of a motor pump unit 62 of the pressure washer 2 of the embodiment seen from the front left upper side.
Figure 10:
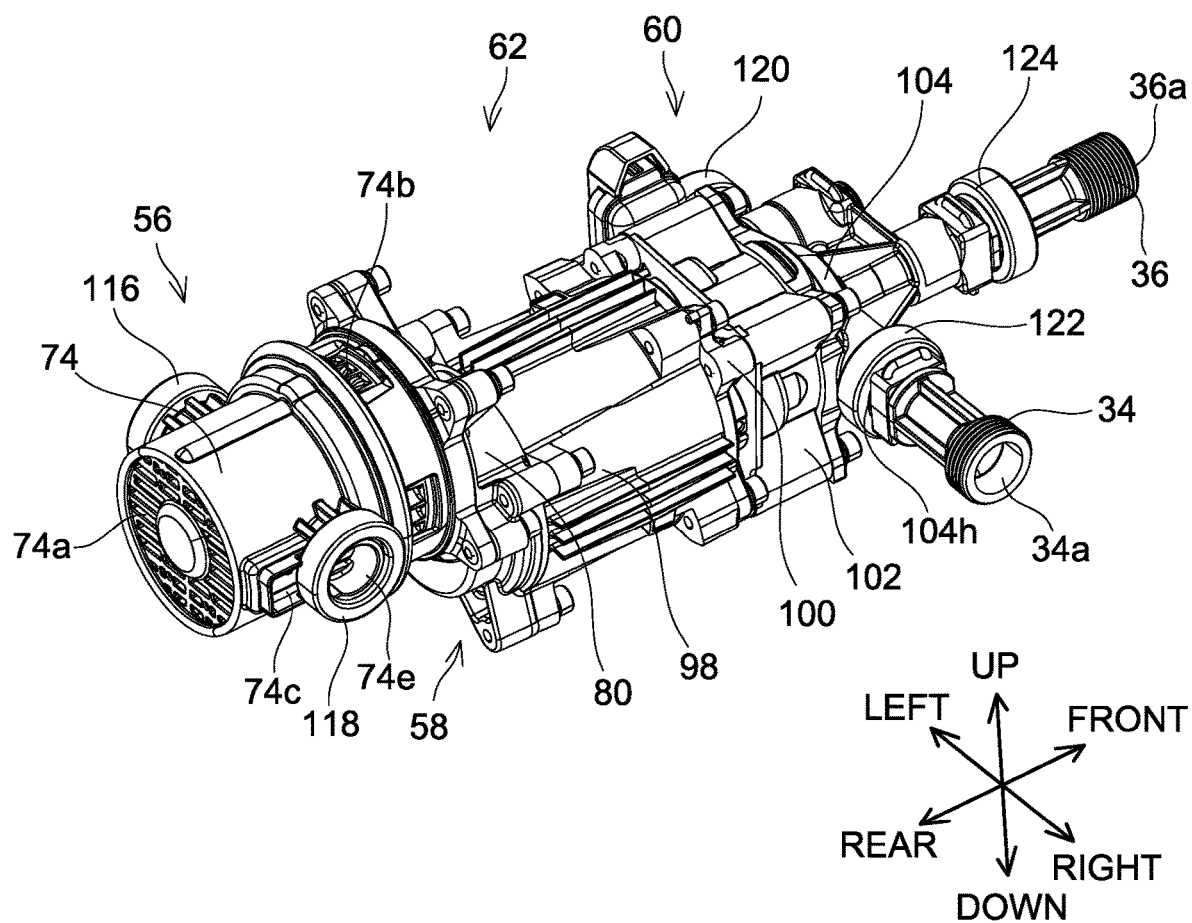
FIG. 10 is a perspective view of the motor pump unit 62 of the pressure washer 2 of the embodiment seen from a rear right upper side.

As shown in FIGS. 9 and 10, the electric motor 56, the driving power transmission mechanism 58, and the pump mechanism 60 are configured integrally as a motor pump unit 62.

Figure 11:
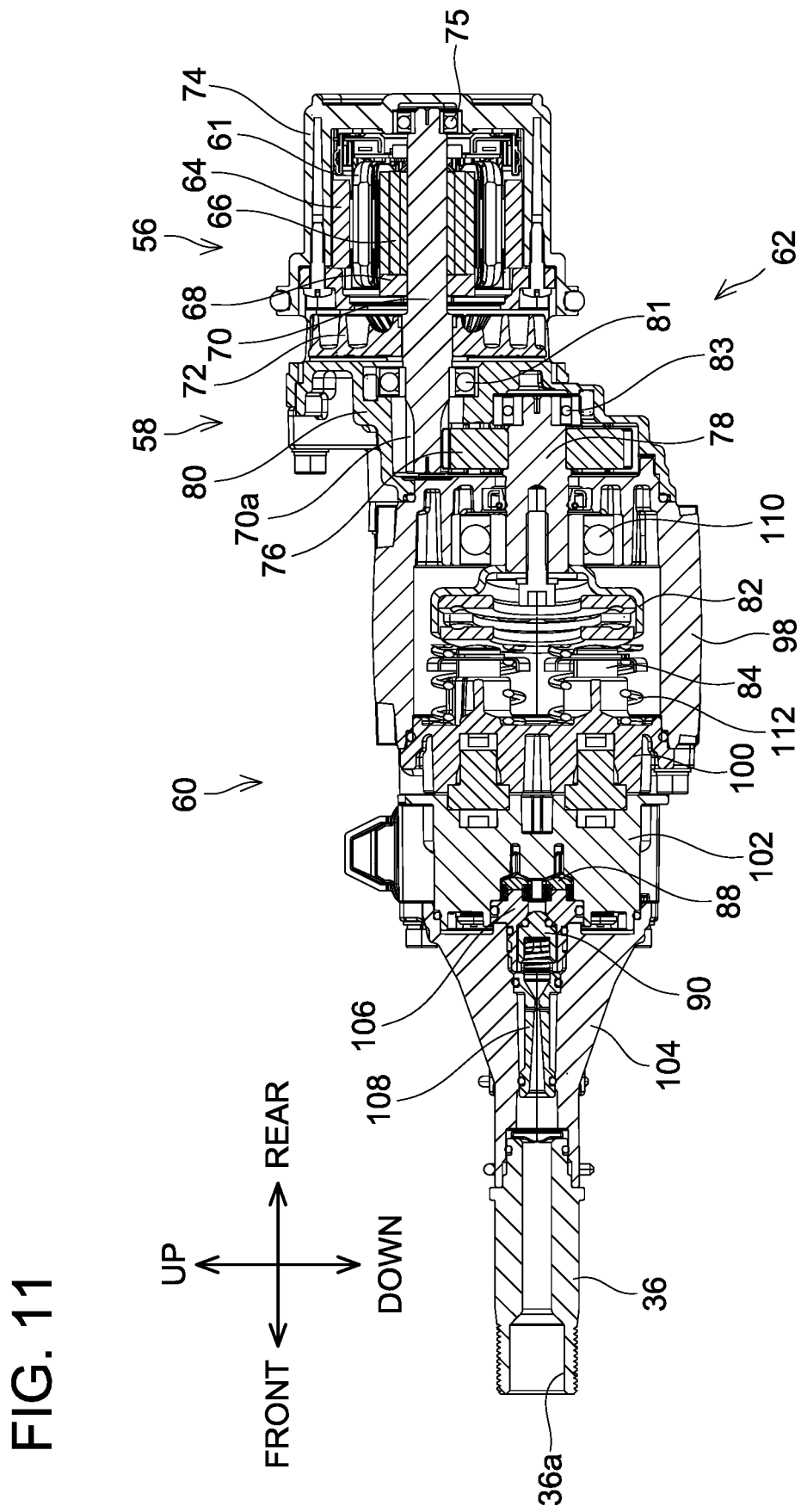
FIG. 11 is a cross-sectional view of the motor pump unit 62 of the pressure washer 2 of the embodiment seen from a right side.

The electric motor 56 may for example be a brushless DC motor of an outer rotor type. As shown in FIG. 11, the electric motor 56 includes a stator 64 on which coils 61 are wound, a rotor 68 including magnets 66, an output shaft 70 fixed to the rotor 68, a fan 72 fixed to the output shaft 70, and a motor housing 74 that houses the stator 64, the rotor 68, and the fan 72. A rear end of the output shaft 70 is rotatably supported by the motor housing 74 via a bearing 75. A front end of the output shaft 70 protrudes frontward from the housing 74. A gear portion 70a is disposed at the front end of the output shaft 70.

As shown in FIG. 10, the motor housing 74 includes an air intake port 74a defined in its rear surface, an air discharge port 74b defined in its peripheral surface proximate to the fan 72, and a through hole 74c defined in its right surface proximate to its rear end. The coils 61 are connected to the ECU 52 via wirings (not shown) extending through the through hole 74c. The ECU 52 includes switching elements (not shown), and controls the operations of the electric motor 56 by switching conductive states of the switching elements to control voltages applied to the coils 61. When the electric motor 56 rotates the output shaft 70, air flows into the motor housing 74 through the air intake port 74a by rotation of the fan 72. The air having flowed in from the air intake port 74a flows through a space between the stator 64 and the rotor 68, and thereafter flows out from the motor housing 74 through the air discharge port 74b located on an outer circumferential side of the fan 72.

As shown in FIG. 11, the driving power transmission mechanism 58 includes a spur gear 76 fixed to a drive shaft 78, and a gear housing 80 that houses the spur gear 76 and the gear portion 70a of the output shaft 70. The gear housing 80 is fixed to a front portion of the motor housing 74. A front end of the output shaft 70 is rotatably supported by the gear housing 80 via a bearing 81. The spur gear 76 is disposed to mesh with the gear portion 70a of the output shaft 70. A rear end of the drive shaft 78 is rotatably supported by the gear housing 80 via a bearing 83. The drive shaft 78 is disposed substantially parallel to the output shaft 70. The drive shaft 78 is disposed at a position offset downward with respect to the output shaft 70 by a predetermined amount. Rotation of the output shaft 70 is decelerated at a predetermined reduction ratio in the driving power transmission mechanism 58, and is transmitted to the drive shaft 78.

Figure 12:
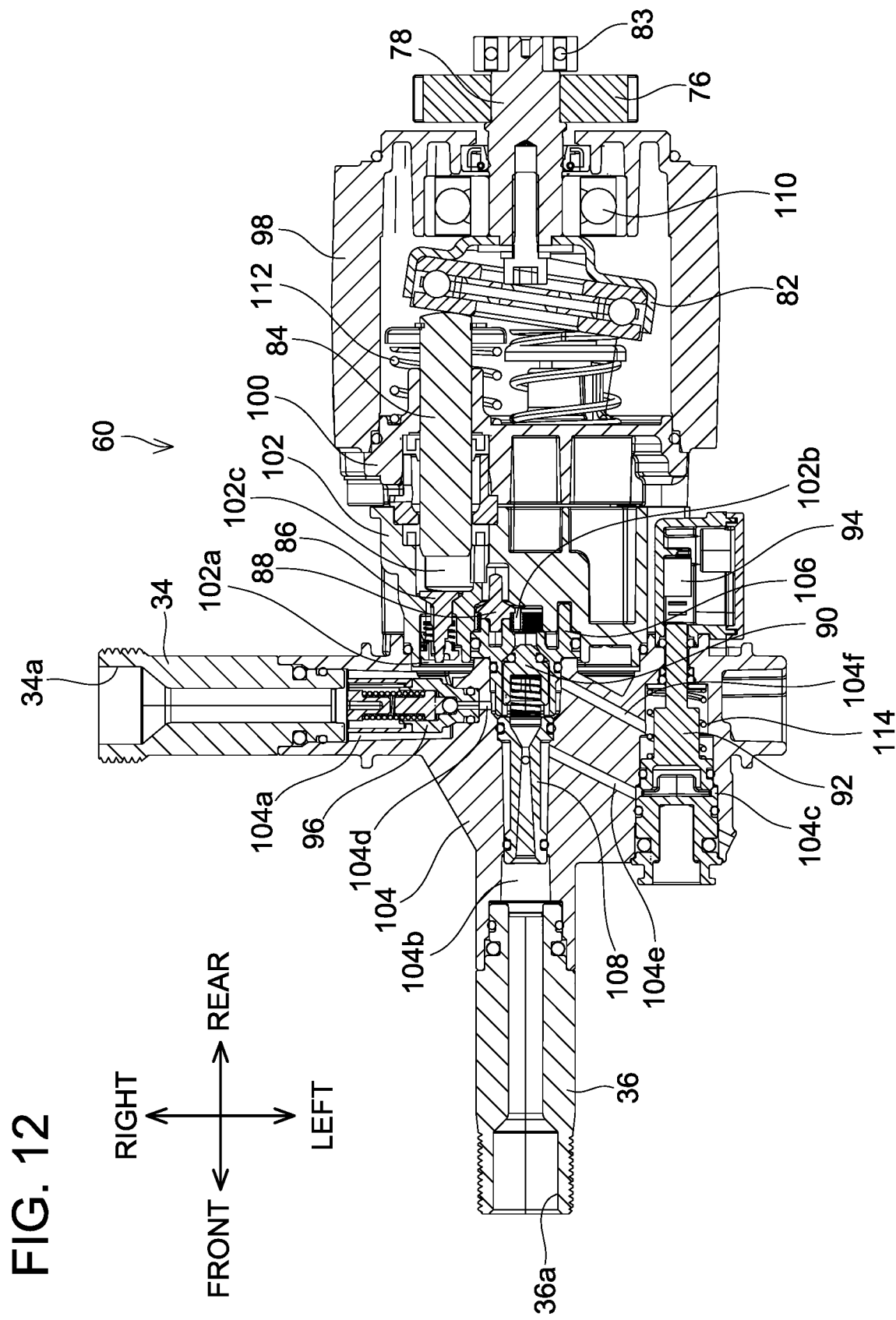
FIG. 12 is a cross-sectional view of a pump mechanism 60 of the pressure washer 2 of the embodiment seen from above.

As shown in FIG. 12, the pump mechanism 60 includes the drive shaft 78, a wobble plate 82, a plurality of pistons 84, a plurality of suction valves 86 corresponding respectively to the plurality of pistons 84, plurality of discharge valves 88 corresponding respectively to the plurality of pistons 84, a spring retainer 90, a pressure pin 92, a detection switch 94, a relief valve 96, a pump housing 98, a piston cylinder 100, a piston housing 102, a pump head 104, a valve holder 106, and an adjustor holder 108.

The wobble plate 82 is housed in the pump housing 98. The wobble plate 82 is fixed to a front end of the drive shaft 78. The drive shaft 78 is rotatably supported by the pump housing 98 via the bearing 110. A front surface of the wobble plate 82 is inclined with respect to a rotary axis of the drive shaft 78. Each of the plurality of pistons 84 has its rear end in contact with the front surface of the wobble plate 82. Each of the plurality of pistons 84 is supported by the piston cylinder 100 such that each of the pistons 84 is slidable in the front-rear direction. The piston cylinder 100 is fixed to a front portion of the pump housing 98. Each of the plurality of pistons 84 is biased rearward by its corresponding spring 112. The plurality of pistons 84 is configured to slide in the front-rear direction in conjunction with rotation of the wobble plate 82.

The piston housing 102 is fixed to a front portion of the piston cylinder 100. The piston housing 102 includes a suction chamber 102a, a discharge chamber 102b, and a plurality of piston chambers 102c corresponding respectively to the plurality of pistons 84. Each of the plurality of piston chambers 102c has its corresponding one of the plurality of suction valves 86 and corresponding one of the plurality of discharge valves 88. Each of the plurality of piston chambers 102c communicates with the suction chamber 102a via its corresponding suction valve 86, and communicates with the discharge chamber 102b via its corresponding discharge valve 88. A rear portion of each of the plurality of piston chambers 102c is closed by a front surface of its corresponding piston 84. Each of the plurality of suction valves 86 is a check valve, and is configured to suction the cleansing water from the suction chamber 102a into its corresponding piston chamber 102c when its corresponding piston 84 retracts, and prohibit the cleansing water from flowing out from its corresponding piston chamber 102c to the suction chamber 102a when its corresponding piston 84 advances. Each of the plurality of discharge valves 88 is a check valve, and is configured to discharge the cleansing water from its corresponding piston chamber 102c to the discharge chamber 102b when its corresponding piston 84 advances, and prohibit the cleansing water from flowing in from the discharge chamber 102b to its corresponding piston chamber 102c when its corresponding piston 84 retracts.

The pump head 104 is fixed to a front portion of the piston housing 102. A pump head 104 has a water inflow chamber 104a to which the water inlet joint 34 is connected, a water outflow chamber 104b to which the water outlet joint 36 is connected, and a pressure detection chamber 104c. The water inflow chamber 104a communicates with the suction chamber 102a of the piston housing 102. The water outflow chamber 104b communicates with the discharge chamber 102b of the piston housing 102. The valve holder 106 and the adjustor holder 108 are disposed in the water outflow chamber 104b. The valve holder 106 holds the plurality of discharge valves 88. The spring retainer 90 is disposed between the valve holder 106 and the adjustor holder 108. The spring retainer 90 is configured to allow the cleansing water to flow from the discharge chamber 102b to the water outflow chamber 104b when a pressure in the water outflow chamber 104b is lower than a pressure in the discharge chamber 102b, and prohibit the cleansing water to flow from the discharge chamber 102b to the water outflow chamber 104b when the pressure in the water outflow chamber 104b is higher than the pressure in the discharge chamber 102b.

The water inflow chamber 104a and the water outflow chamber 104b communicate with each other via a relief passage 104d. The relief valve 96 is disposed in the water inflow chamber 104a. The relief valve 96 is configured to close the relief passage 104d when a pressure in the water inflow chamber 104a is higher than a pressure in the water outflow chamber 104b, and open the relief passage 104d when the pressure in the water inflow chamber 104a is lower than the pressure in the water outflow chamber 104b. When the relief passage 104d is opened, the pressure in the water outflow chamber 104b reduced to the pressure in the water inflow chamber 104a.

The pressure pin 92 is disposed in the pressure detection chamber 104c. The pressure detection chamber 104c is partitioned into a space on a front side and a space on a rear side by the pressure pin 92. The pressure pin 92 is supported by the pump head 104 such that the pressure pin 92 is slidable in the front-rear direction. Further, the pressure pin 92 is biased frontward by a spring 114. The detection switch 94 is disposed behind the pressure pin 92. The detection switch 94 is connected to the ECU 52 via wirings that are not shown. The space in the pressure detection chamber 104c on the front side of the pressure pin 92 communicates with a space in the water outflow chamber 104b downstream of the adjustor holder 108 via a first pressure detection passage 104e. The space in the pressure detection chamber 104c on the rear side of the pressure pin 92 communicates with a space in the water outflow chamber 104b upstream of the adjustor holder 108 via a second pressure detection passage 104f.

In the pressure washer 2, when the trigger gun 16 shifts from a state of supplying the cleansing water to the nozzle 18 to a state of cutting off supply of the cleansing water to the nozzle 18 while the pump mechanism 60 is discharging the cleansing water, the pressure in the water outflow chamber 104b rapidly increases. In this case, the spring retainer 90 prohibits the cleansing water to flow from the discharge chamber 102b to the water outflow chamber 104b, and also the pressure pin 92 moves rearward and comes into contact with the detection switch 94. The ECU 52 recognizes, based on a detection signal from the detection switch 94, that the trigger gun 16 has shifted from the state of supplying the cleansing water to the nozzle 18 to the state of cutting off the supply of the cleansing water to the nozzle 18, and stops the electric motor 56. Further, the relief valve 96 opens due to the pressure in the water outflow chamber 104b having increased, the relief passage 104d is thereby opened, and the pressure in the water outflow chamber 104b is reduced to the pressure in the water inflow chamber 104a.

As shown in FIGS. 9 and 10, the motor housing 74 includes a substantially cylindrical left supporting unit 74d protruding leftward from its left surface and a substantially cylindrical right supporting unit 74e protruding rightward from its right surface. The left supporting unit 74d is supported by the left housing 20 via a substantially cylindrical vibration isolating rubber 116 surrounding an outer periphery of the left supporting unit 74d. The right supporting unit 74e is supported by the right housing 22 via a substantially cylindrical vibration isolating rubber 118 surrounding an outer periphery of the right supporting unit 74e. The pump head 104 includes a substantially cylindrical left supporting unit 104g protruding leftward from its left surface. Further, a substantially cylindrical right supporting unit 104h is disposed in the pump head 104 proximate to the water inflow chamber 104a. The left supporting unit 104g is supported by the left housing 20 via a substantially cylindrical vibration isolating rubber 120 surrounding an outer periphery of the left supporting unit 104g. The right supporting unit 104h is supported by the right housing 22 via a substantially cylindrical vibration isolating rubber 122 surrounding an outer periphery of the right supporting unit 104h. The water outlet joint 36 is supported by the left housing 20 and the right housing 22 via a substantially cylindrical vibration isolating rubber 124 surrounding an outer periphery of the water outlet joint 36.

As shown in FIG. 7, the inside of the body housing 28 is partitioned, by a partition wall 28b provided in the right housing 22 and the left housing 20, into a pump chamber 28c, an intake chamber 28d disposed on a front upper side of the pump chamber 28c, an ECU chamber 28e disposed above the pump chamber 28c, a motor chamber 28f disposed behind the pump chamber 28c and the ECU chamber 28e, and a switch chamber 28g inside the supporting base 28a. The intake chamber 28d communicates with the outside of the body housing 28 through an intake hole 28h (see FIG. 5) defined at a front lower portion of a right surface of the right housing 22. Further, the intake chamber 28d extends in a rear upward direction along a lower surface of the battery box 30 and communicates with a front lower portion of the ECU chamber 28e. A rear lower portion of the ECU chamber 28e communicates with a front upper portion of the motor chamber 28f. A through hole 28i through which the electric motor 56 extends is defined in the partition wall 28b between the pump chamber 28c and the motor chamber 28f. A clearance of the through hole 28i between the electric motor 56 and the partition wall 28b when the motor pump unit 62 is attached to the body housing 28 is closed by a substantially ring-shaped sponge 126 disposed on an outer peripheral surface of the motor housing 74. In a state where the motor pump unit 62 is attached to the body housing 28, the stator 64 and the rotor 68 of the electric motor 56 are disposed in the motor chamber 28f, and the fan 72 of the electric motor 56, the driving power transmission mechanism 58, and the pump mechanism 60 are disposed in the pump chamber 28c. In this case, the air intake port 74a of the motor housing 74 is disposed in the motor chamber 28f and the air discharge port 74b of the motor housing 74 is disposed in the pump chamber 28c. A discharge hole 28j for discharging water and air to the outside of the body housing 28 from the pump chamber 28c is defined at the center of a lower surface of the pump chamber 28c.

When the electric motor 56 is driven in the pressure washer 2, air flows into the intake chamber 28d through the intake hole 28h from the outside of the body housing 28 by the rotation of the fan 72. The air having entered the intake chamber 28d flows through the ECU chamber 28e and then into the motor chamber 28f. The air having entered the motor chamber 28f flows into the motor housing 74 through the air intake port 74a, flows within the motor housing 74 from the rear toward the front, and flows into the pump chamber 28c through the air discharge port 74b. The air having entered the pump chamber 28c is discharged to the outside of the body housing 28 through the discharge hole 28j. This flow of the air cools the ECU 52, the electric motor 56, and the pump mechanism 60 inside the body housing 28.

The water drainage hole 30d of the battery box 30 communicates with the intake chamber 28d. Due to this, the water having entered the body housing 28 from the battery box 30 through the water drainage hole 30d does not flow into the ECU chamber 28e, the motor chamber 28f, nor the switch chamber 28g.

As shown in FIG. 3, in the pressure washer 2 of the present embodiment, a position of a center of gravity G1 with respect to the right-left direction in the state of having the batteries 38a, 38b attached is located within an area that is 1.5 times a width W of the top handle 32 from a center line of the top handle 32 in the right-left direction when the pressure washer 2 is seen from above. Due to this, when the pressure washer 2 in the state of having the batteries 38a, 38b attached is to be lifted up by gripping the top handle 32, balance in the right-left direction can easily be achieved. Further, in the pressure washer 2 of the present embodiment, a position of a center of gravity G2 with respect to the right-left direction in a state of having detached the batteries 38a, 38b is located within the area that is 1.5 times the width W of the top handle 32 from the center line of the top handle 32 in the right-left direction when the pressure washer 2 is seen from above. Due to this, when the pressure washer 2 in the state of having the batteries 38a, 38b detached is to be lifted up by gripping the top handle 32, the balance in the right-left direction can easily be achieved.

As shown in FIG. 4, in the pressure washer 2 of the present embodiment, the position of the center of gravity G1 with respect to the front-rear direction in the state of having the batteries 38a, 38b attached is located within an area between a front end and a rear end of a lower surface of the top handle 32 when the pressure washer 2 is seen from the left. Due to this, when the pressure washer 2 in the state of having the batteries 38a, 38b attached is to be lifted up by gripping the top handle 32, balance in the front-rear direction can easily be achieved. Further, in the pressure washer 2 of the present embodiment, the position of the center of gravity G2 with respect to the front-rear direction in the state of having detached the batteries 38a, 38b is located within the area between the front end and the rear end of the lower surface of the top handle 32 when the pressure washer 2 is seen from the left. Due to this, when the pressure washer 2 in the state of having the batteries 38a, 38b detached is to be lifted up by gripping the top handle 32, the balance in the front-rear direction can easily be achieved.

As shown in FIG. 2, in the pressure washer 2 of the present embodiment, the water inlet 34a is disposed on a right surface of the housing 27 and the water outlet 36a is disposed on a front surface of the housing 27. As shown in FIGS. 3 and 4, among outer surfaces of the housing 27 where the water inlet 34a and the water outlet 36a are not disposed, that is, among a bottom surface, a left surface, a rear surface, and an upper surface thereof, the rear surface being the outer surface most proximate to the electric motor 56 has a shape that is rounded in the up-down direction and in the right-left direction. Due to this, when the rear surface of the housing 27 is used as a placement surface, the pressure washer 2 cannot stand on its own and falls down. Due to this, the pressure washer 2 can be prevented from being used in a state where the pressure washer 2 is placed with the rear surface of the housing 27 as the placement surface. Even when water is gathered inside the housing 27, the water can be prevented from wetting the electric motor 56. The shape of the rear surface of the housing 27 may be an arbitrary shape so long as it is a shape that does not allow the pressure washer to stand on its own when the rear surface is used as the placement surface.

As above, in one or more embodiments, the pressure washer 2 includes the pump mechanism 60 configured to pressurize the water supplied through the water inlet 34a and pump out the same through the water outlet 36a, the electric motor 56 configured to drive the pump mechanism 60, the housing 27 that houses the pump mechanism 60 and the electric motor 56, and the plurality of batteries 38a, 38b detachably attached to the housing 27 and configured to supply the power to the electric motor 56.

According to the above configuration, high-voltage power (such as 36V) can be supplied to the electric motor 56 by electrically connecting the plurality of low-voltage (such as 18V) batteries 38a, 38b in series. The low-voltage batteries 38a, 38b can be used in the high-output pressure washer 2.

In one or more embodiments, pressure washer 2 further includes the top handle 32 provided at the upper portion of the housing 27 and having the longitudinal direction along the front-rear direction when the pressure washer 2 is seen from above. In the right-left direction, the position of the center of gravity G1 of the pressure washer 2 to which the plurality of batteries 38a, 38b is attached is located within the area 1.5 times the width of the top handle 32 in the right-left direction from the center line of the top handle 32.

According to the above configuration, the balance in the right-left direction can be achieved easily upon gripping the top handle 32 and lifting up the pressure washer 2.

In one or more embodiments, the pressure washer 2 further includes the top handle 32 provided at the upper portion of the housing 27 and having the longitudinal direction along the front-rear direction when the pressure washer 2 is seen from above. In the front-rear direction, the position of the center of gravity G1 of the pressure washer 2 to which the plurality of batteries 38a, 38b is attached is located within the area between the front and rear ends of the lower surface of the top handle 32.

According to the above configuration, the balance in the front-rear direction can be achieved easily upon gripping the top handle 32 and lifting up the pressure washer 2.

In one or more embodiments, the pressure washer 2 includes the pump mechanism 60 configured to pressurize the water supplied through the water inlet 34a and pump out the same through the water outlet 36a in accordance with rotation of the drive shaft 78, the electric motor 56 configured to drive the output shaft 70, the driving power transmission mechanism 58 configured to transmit the driving power from the output shaft 70 to the drive shaft 78, and the housing 27 that houses the pump mechanism 60, the electric motor 56, and the driving power transmission mechanism 58. The output shaft 70 is disposed substantially parallel to the drive shaft 78. The output shaft 70 is disposed higher than the drive shaft 78.

In the above configuration, since the output shaft 70 of the electric motor 56 is disposed higher than the drive shaft 78 of the pump mechanism 60, the electric motor 56 is disposed slightly higher than the pump mechanism 60. Due to this, even if the water leaks from the pump mechanism 60, the water can be prevented from wetting the electric motor 56, by which failure of the electric motor 56 can be prevented.

In one or more embodiments, the pressure washer 2 further includes the batteries 38a, 38b detachably attached to the housing 27 and configured to supply the power to the electric motor 56. The position of the lower ends of the batteries 38a, 38b when the batteries 38a, 38b are attached are disposed higher than the drive shaft 78.

When the water wets the batteries 38a, 38b, the batteries 38a, 38b may fail. In the above configuration, since the lower ends of the batteries 38a, 38b are disposed higher than the drive shaft 78 of the pump mechanism 60, the batteries 38a, 38b are disposed slightly higher than the pump mechanism 60. Due to this, even if the water leaks from the pump mechanism 60, the water can be prevented from wetting the batteries 38a, 38b, by which failure of the batteries 38a, 38b can be prevented.

In one or more embodiments, the pressure washer 2 further includes the ECU 52 housed in the housing 27 and configured to control the operations of the electric motor 56. The ECU 52 is disposed higher than the pump mechanism 60.

When the water wets the ECU 52, the ECU 52 may fail. In the above configuration, the ECU 52 is disposed higher than the pump mechanism 60. Due to this, even if the water leaks from the pump mechanism 60, the water can be prevented from wetting the ECU 52, by which failure of the ECU 52 can be prevented.

In one or more embodiments, the pressure washer 2 includes the pump mechanism 60 configured to pressurize the water supplied through the water inlet 34a and pump out the water through the water outlet 36a, the electric motor 56 configured to drive the pump mechanism 60, and the housing 27 that houses the pump mechanism 60 and the electric motor 56. The outer surface of the housing 27 most proximate to the electric motor 56 has the shape that does not allow the pressure washer 2 to stand on its own when the outer surface is used as the placement surface.

If the pressure washer 2 is configured to stand on its own with the outer surface of the housing 27 most proximate to the electric motor 56 as the placement surface, the pressure washer 2 could be used in this state, which may result in failure of the electric motor 56 due to being wetted by the water when the water gathers inside the housing 27. According to the above configuration, since the pressure washer 2 cannot stand on its own with the outer surface of the housing 27 most proximate to the electric motor 56 as the placement surface, the pressure washer 2 can be prevented from being used in this state. Due to this, when the water gathers inside the housing 27, the water can be prevented from wetting the electric motor 56, and failure of the electric motor 56 can be prevented.

In one or more embodiments, the outer surface of the housing 27 most proximate to the electric motor 56 has the shape that is rounded in two directions orthogonal to each other.

According to the above configuration, it can be ensured that the pressure washer 2 does not stand on its own when the outer surface of the housing 27 most proximate to the electric motor 56 is used as the placement surface.

In one or more embodiments, the outer surface of the housing 27 most proximate to the electric motor 56 has the shape protruding outward.

According to the above configuration, it can be ensured that the pressure washer 2 does not stand on its own when the outer surface of the housing 27 most proximate to the electric motor 56 is used as the placement surface.

In one or more embodiments, the pressure washer 2 further includes the batteries 38a, 38b configured to supply the power to the electric motor 56, and the battery box cover 24 (an example of a cover member) that covers the space in which the batteries 38a, 38b are housed and that can be opened and closed. In the pressure washer 2, the battery box cover 24 is in a closed state when the pressure washer 2 is placed.

According to the above configuration, since the battery box cover 24 is in the closed state when the pressure washer 2 is used in the state of being placed, the water can be prevented from entering the space in which the batteries 38a, 38b are housed.

The invention claimed is:

1. A pressure washer comprising:
   a pump mechanism configured to pressurize water supplied through a water inlet and pump out the water through a water outlet;
   an electric motor configured to drive the pump mechanism; and
   a housing that houses the pump mechanism and the electric motor, wherein the housing includes an exterior facing lower surface and an exterior facing upper surface that faces in an opposite direction from the exterior facing lower surface,
   wherein an outer surface of the housing most proximate to the electric motor has a shape that does not allow the pressure washer to stand on its own when the outer surface is rested on a flat surface, wherein the outer surface is an exterior facing side surface of the housing that extends from the exterior facing lower surface to the exterior facing upper surface of the housing, wherein any three points on the outer surface that surround a projection point on which a center of gravity of the pressure washer is projected cannot simultaneously contact the flat surface, and wherein the outer surface of the housing most proximate to the electric motor has a shape that is rounded in two directions orthogonal to each other.

2. The pressure washer according to claim 1, wherein the outer surface of the housing most proximate to the electric motor has a shape protruding outward.

3. The pressure washer according to claim 2, further comprising:
 a battery configured to supply power to the electric motor; and
 a cover member that covers a space in which the battery is housed and that can be opened and closed,
 wherein the cover member is closed when the outer surface is rested on the flat surface.

* * * * *